US006307585B1

United States Patent
Hentschke

(10) Patent No.: US 6,307,585 B1
(45) Date of Patent: Oct. 23, 2001

(54) POSITION-ADAPTIVE AUTOSTEREOSCOPIC MONITOR (PAM)

(76) Inventor: Siegbert Hentschke, Wilhelmshöher Allee 71, 34121 Kassel (DE)

(*) Notice: Subject to any disclaimer, the term of this patent is extended or adjusted under 35 U.S.C. 154(b) by 0 days.

(21) Appl. No.: 08/939,738

(22) Filed: Oct. 6, 1997

(30) Foreign Application Priority Data

Oct. 9, 1996 (DE) .............................................. 196 40 936

(51) Int. Cl.$^7$ .................................................. H04N 13/04
(52) U.S. Cl. ............................................. 348/51; 359/630
(58) Field of Search ................................. 348/51, 54, 59, 348/42, 47; 359/462, 463, 623, 466, 619, 467, 630; 349/106, 110; 445/24

(56) References Cited

U.S. PATENT DOCUMENTS

| 5,349,379 | * | 9/1994 | Eichenlaub | 348/51 |
|---|---|---|---|---|
| 5,712,732 | * | 1/1998 | Street | 359/630 |
| 5,771,121 | * | 6/1998 | Hentschke | 348/51 |
| 5,833,507 | * | 11/1998 | Woodgate et al. | 445/24 |
| 5,936,774 | * | 8/1999 | Street | 359/630 |
| 5,959,664 | * | 10/1999 | Woodgate | 348/51 |
| 5,978,143 | * | 11/1999 | Spruck | 348/47 |

FOREIGN PATENT DOCUMENTS

| 39 21 061 A1 | 1/1991 | (DE) . |
|---|---|---|
| 41 14 023 A1 | 11/1992 | (DE) . |
| 195 00 315 C | 10/1995 | (DE) . |
| 196 00 315 C1 | 10/1995 | (DE) . |
| 44 33 058 A1 | 3/1996 | (DE) . |
| 0 332 268 A1 | 9/1989 | (EP) . |
| 0 659 324 A | 6/1995 | (EP) . |
| 0 729 054 A | 8/1996 | (EP) . |
| 2 705 008 A1 | 11/1994 | (FR) . |

OTHER PUBLICATIONS

"Autostereoscopic 3D–Imaging by Front and Rear projection and on Flat Panel Displays", R. Boerner, 1993 Butterworth–Heinmann Ltd, Displays vol. 14, Nov. 1, 1993, pp. 39–46.

IPM institut fuer Periphere Mikroelektronik, S. Hentschke, Project: "Stereoskope Echzeit–Bildveratbeitung", CeBIT Exponant und Brochure 1994.

"3D Imaging Systems for telecommunications applications", D.E. Sheat, G. R. chamberin, P. Gentry, J.S. Leggat, D.J. McCartney, proc. SPIE, vol. 1669, p. 186 Electronic Imaging Systems and Applications Meeting.

(List continued on next page.)

Primary Examiner—Chris Kelley
Assistant Examiner—Gims Philippe
(74) Attorney, Agent, or Firm—Michael J. Striker

(57) ABSTRACT

Position-adaptive autostereoscopic monitor (PAM) has an image screen having a plurality of color sub-pixels of three-different colors, located horizontally one beside the other in a same given sequential order for defining image pixels, and a means such as lenticular prism grids and barrier stripe grids, being positioned in front of the image screen, wherein right and left image pixels are position-adaptively generated such that an area only being visible from a direction of a right eye of a viewer, an area only being visible from a left eye of a viewer, empty areas which are not visible at all from both eyes and interference areas which are at the same time visible from a direction of the right eye as well as from a direction of the left eye are obtained and that those neighbored ones of the sub-pixels are set dark which are located in the interference areas and the empty areas, and wherein the image pixels within each of the areas being visible from the directions of the right and left eye are chosen such that they contain three different ones of the color sub-pixels with a sequential order being dependent upon a viewing direction of the viewer.

7 Claims, 2 Drawing Sheets

OTHER PUBLICATIONS

"The Heidelberg Ray tracing Model", by H. Mainzer, K. Metz, D. Scheppelmann, U. Engelmann, H. Bauer, IEEE Computer Graphics and Appl. No. 1991, p.34ff.

"Autostereoskopische Rueckprojektions–und Flachbildschrime", by R. Boerner, Fehn– und Kino–technik 48, Nr. Nov. 1994, pp. 594–600.

"Personenadaptiver Autostereoskoper Monitor (PAAS)—eine Option fuer den Fernseher?", by S. Hentschke, Fernseh– und Kino–Technik 50, Nr. May 1996, pp. 242–248.

"Autostereoskope Bildwiedergabe—eine Option fuer den Fernseher?", by S. Hentschke, 17 FKTG–Tagung, Wien 1996, Ttagungsband.

* cited by examiner

POSITION-ADAPTIVE AUTOSTEREOSCOPIC MONITOR (PAM)

BACKGROUND OF THE INVENTION

1. Subject of the Invention

The invention refers to a video monitor for autostereoscopic imaging of three dimensional images or scenes in which the stereoscopic views are adaptively controlled according to the position of an observer in front of the monitor. The most important application of this 3D monitor is foreseen to be microsurgery and computer tomography in which the viewing of the third depth dimension to the observer will be a big advantage to the user who does not want to carry disturbing additional eye-glasses. Objects to be analyzed or micro-mechanically manipulated then appear before or behind the screen in the correct 3D position. The 3D presentation is based on two channel signal processing giving the different views of objects for the left and right eye corresponding to the observer position. The whole system for a person-adaptive monitor consists of the monitor itself, of a head-tracking device and a (real-time) graphic computer. The full stereoscopic adaptation is carried out electronically for one person by real time head-tracking processing without physical movements of devices. Further application could be 3D TV when a two channel transmission will be installed. For compatibility reasons switching on and off of 3D effects should be possible.

2. State of the Art

Stereoscopic methods of filming and projecting have been in use for years. Most methods use polarizing light (horizontally, vertically and circularly) in order to separate the right from the left picture. Verhulst, A. G.: Display and pick-up device for stereoscopic picture display: European Patent 0 332 268 (1988). The development of LCD-technologie has made feasible electronic control of the light-transmission of crystals. This has made possible the shutter-technique, which alternatingly makes the left and right glass of shutter-glasses non-light transmissive and synchronously displays the right and left picture sequentially on the monitor S. Hentschke, A. Herrfeld, C. Junge, R. Kothe: Stereoskope Echtzeitbildverarbeitung. CeBIT Exponat und Broschure (1994).

Autostereoscopic projections are realized by means of projection panels with stripe lens grids from different projection directions. Each perspective picture is then fitted to the correct projection direction, R. Börner. Autostereoscopic 3-D Imaging by Front and Rear Projection and on Flat Panel Displays. Displays, Vol. 14, No. 1 (1993), pp. 39–46. However, it is almost impossible to achieve a continuous transition from one view to the next, for the number of projection directions cannot be enlarged arbitrarily. With an autostereoscopic display aimed at one single user, only two perspectives are used, that require a certain direction of viewing, Sheat D E, Chamberlin G R, Gentry P, Leggat J S, McCartney D J: 3-D Imaging Systems for Telecommunications Applications. Proc. SPIE, Vol.1669, p.186. Electronic Imaging Systems and Applications Meeting, San José (1992)—and "[7]" with—R. Börner: Autostereoskope Rückprojektions—und Flachbildschirme. Fernseh—und Kinotechnik Bd. 48, Nr. 11 (1994). S. 594–600, [7]. A fully stereoscopic picture like in a hologram is achieved by use of "head tracking sensors" that control the high-capacity real-time computer for calculation of the fitting stereoscopic perspective on the one hand, and on the other hand control the autostereoscopic display for mechanical adjustment of the lens grid shield. It detects the exact position and movement of the observer's head and simultaneously generates the fitting pictures. Furthermore, expensive VR-Systems (Virtual Reality) utilizing "Head Mounted Displays" are in use.

Nuclear Magnetic Resonance and Computed Tomography are the most important fields of application of stereoscopic 3D-imaging in medical engineering. In order to calculate certain perspectives needed, high-performance computers are being developed for "Volume Tracking Algorithms" H. P. Mainzer, Meetz, D. Scheppelmann, U. Engelmann, H. J. Bauer: The Heidelberg Ray Tracing Model. IEEE Computer Graphics and Appl. November 1991 pp. 34ff. The combined computed visualization and real-time transmission of endoscopes are becoming a very important neuro-surgical tool. Stereoscopic endoscopes are currently in use already. It will be easy to combine an infrared based "head tracking sensor" with an observer-adaptive autostereoscopic monitor system for electronic control of movement.

A Person-Adaptive Autostereoscopic Shutter Screen (PAAS) is known from S. Hentschke, Personenadaptiver autostereoskoper Shutter Bildschim (PAAS). Patentschrift DE 19500315 C, (1995). But it needs a fast double display technology which is not yet available today. Another autostereoscopic display has been shown in Alio, Pierre: Dispositif et système vidèo autostereoscopique. Demande de Brevet d'invention, Numéro de publication: 2 705 008. But this one is not adaptive with respect to the observer position; it is based on fixed viewing directions (preferably 4). Hence a correct autostereoscopic view is only possible from some fixed positions.

3. Problem To Be Solved

To get a comfortable presentation of 3D images an autostereoscopic method is necessary. The position of the user must not be restricted to one point in front of the monitor but the movement of the observer's head should be used to be able to observe a 3D object from different points of view. This makes necessary to apply an adaptive system which, of course, must be oriented to only one person. The further problem to be solved is to find a pure electronical adaptive control of the observer's position and autostereoscopic view to avoid maintenance problems and micromechanical movements of lenticular lens screens in known systems S. Hentschke: Personenbezogener autostereoskoper Bildschirm. Patentanmeldung P 44 33 058.8 (1994). A wide application field is of importance to achieve high volumes and low prices of such an adaptive autostereoscopic system. In addition a double-display solution should be avoided which is used for example in an autostereoscopic Shutter method cf. S. Hentschke, Personenadaptiver autostereoskoper Shutter Bildschim (PAAS). Patentschrift DE 19500315 C, (1995).

Up to now, there are known no adaptive autostereoscopic monitors that can be built an the basis of conventional monitors to which can be added different supplementary electronical and physical components to get easily an autostereoscopic system. This problem is to be solved by this invention.

Summary of the Invention

Position-adaptive Autostereoscopic Monitor (PAM)

The most comfortable presentation of images is a stereoscopic one in which the different views of objects change according to the different views from the different positions of the eyes. In this contribution is presented an electronically controlled Position-adaptive Autostereoscopic Monitor that realizes these features: three dimensional imaging is possible without supplementary aids like eye-glasses or head-mounted devices.

The autostereoscopic vision is realized by a vertical lenticular prism grid glass (1), (2) which is arranged in front of an image screen (3). The pixels of the right and left images are assigned by a controller to the display pixels observer position-dependently. The image screen may consist of a TFT display, a panel back projection, or a special color image tube. The correct location of the left and right pixels is processed by an Autostereoscopic Adaptation Coder (AAC) in which the color sub-pixels itselfs on the display are processed and sorted in another manner according to the correct view of the observer's position. The color sub-pixel processing is done in such a way that for the right eye in each vertical stripe are visible exactly three color sub-pixels of the right image and that for the left eye are visible the corresponding sub-pixels of the left image. Those color sub-pixels on the screen that are visible to both eyes or to no eye are not used or are set dark.

The sub-pixel processing is updated for each frame (respectively each half-frame) so that continuously on varying positions the observer's right eye gets all the right images and the observer's left eye gets all the left images only. The time between the frames can be used to process the position-depended correct views of objects by a graphic computer. Also additional wanted views of objects thereby can be controlled by a 3D mouse or by certain movements of the observer's head.

Accordingly, it is an object of the present invention to provide a positive-adaptive autosteroscopic monitor (pam) which avoids the disadvantages of the prior art.

In accordance with the present invention a positive-adaptive autostereoscopic monitor includes an image screen selected of a group of screens including conventional color image tubes, displays and panel back projections, said screen having a plurality of color sub-pixels of three-different colors, said subpixels being located horizontally one beside the other in a same given sequential order for defining image pixels; and a means selected of a group of means including lenticular prism grids and barrier stripe grids, said means being positioned in front of said image screen; wherein right and left image pixels are position-adaptively generated such that an area only being visible from a direction of a right eye of a viewer, an area only being visible from a left eye of a viewer, empty areas which are not visible at all from both eyes and interference areas which are at the same time visible from a direction of the right eye as well as from a direction of the left eye are obtained and that those neighbored ones of said sub-pixels are set dark which are located in said interference areas and said empty areas, and wherein said image pixels within each of said areas being visible from the directions of the right and left eye are chosen such that they contain three different ones of said color sub-pixels with a sequential order being dependent upon a viewing direction of said viewer.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
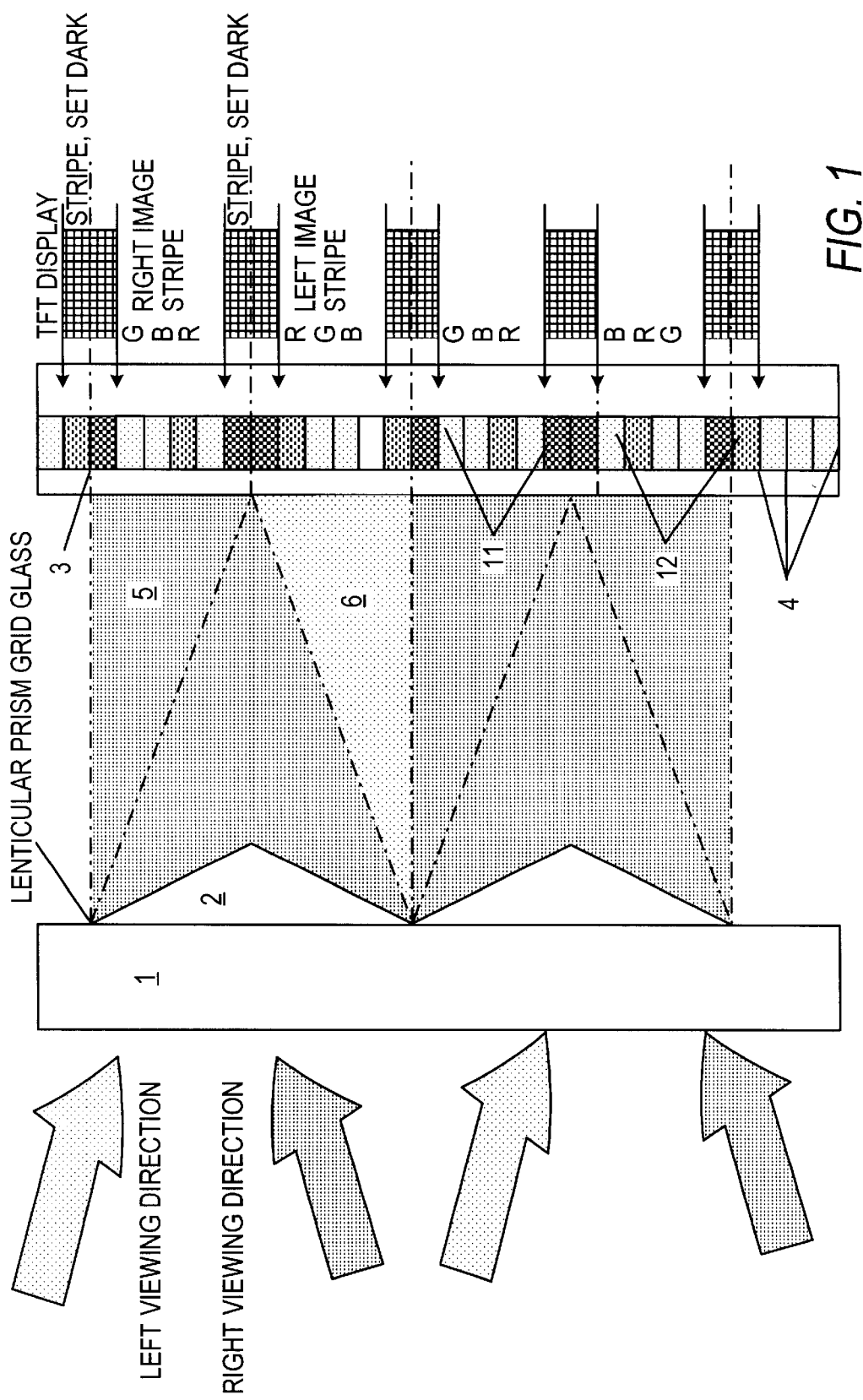
FIG. 1 is a view showing a position-adaptive autostereoscopic screen with a lenticular prism grid, with a horizontal cut, magnified part with marked areas showing the light ray flow.

The Position-adaptive Monitor (PAM) is connected to a Personal computer or to a 3D graphic computer or to a TV signal where two images, a left and a right one for the left resp. the right eye are prepared or stored. In addition the PAM has got an observer position detector. The PAM normally uses a TFT screen. Into the digital signal stream to the display is inserted a new Autostereoscopic Adaptation Coder (AAC) that mixes the pixels from the left and right image in a predefined adaptive manner which is described in the following principle of the invention.

A lenticular prism grid glass (1), (2) is mounted directly in front of a monitor screen on which the color sub-pixels R,G,B; (Red, Green, Blue) appear horizontally side by side and for which the Autostereoscopic Adaptation Coder (AAC) does a specific real-time color sub-pixel processing. The image screen can consist of a TFT display or a panel back projection screen, but in certain cases it can also consist of an electron beam tube. The AAC interface processes oberserver-position-dependently the color sub-pixel in such a way that to the oberserver's right eye are visible only the color sub-pixels belonging to the right image and that to the observer's left eye are only visible those color sub-pixels which belong to the left image. The different view directions (5), (6) for the left and right eye make possible to substitute the lenticular prism grid glass (1), (2) by a barrier stripe grid film (1') that is mounted in a defined distance in front of the color pixels of the screen (3'). The AAC interface may change the order of the color sub-pixels within the left and within the right image and may leave out (or set dark) certain color sub-pixels on the screen which are situated in a left-right transition area. Thus, to each observer's eye is transmitted his own color image presenting the two correct views of 3D objects or scenes according to the detected observer's eye positions. The adaptive view processing can be done by a Graphic computer but it is also possible to use two non-adaptive left and right image channels coming from a 3D video recorder. A more detailed description is given in the following chapter.

The Position-adaptive autostereoscopic monitor (PAM) is based on a color image screen (3) on which the three color subpixels R,G,B (Red Green, Blue) of an image pixel are arranged horizontally side by side. Hence, the horizontal color sub-pixel width is approximatly ⅓ of the pixel size. To the monitor are linked two image channels, one for the left image and one for the right image. There exist different possibilities how the left and right image signals are coded for example there exist standard video signals (PAL, NTSC) which use one half frame for the left image and the other frame for the right image. Some 3D Graphic computers present and transmit the left image at the left half of the image frame and the right image at the right half of the frame. Into the signal stream to the stereoscopic monitor is inserted a special Autostereoscopic Adaptation Coder (AAC) which links and mixes left and right image pixels on pre-processed sub-pixel positions on the image screen adaptively, according to a detected observer's position in front of the monitor.

Figure 2:
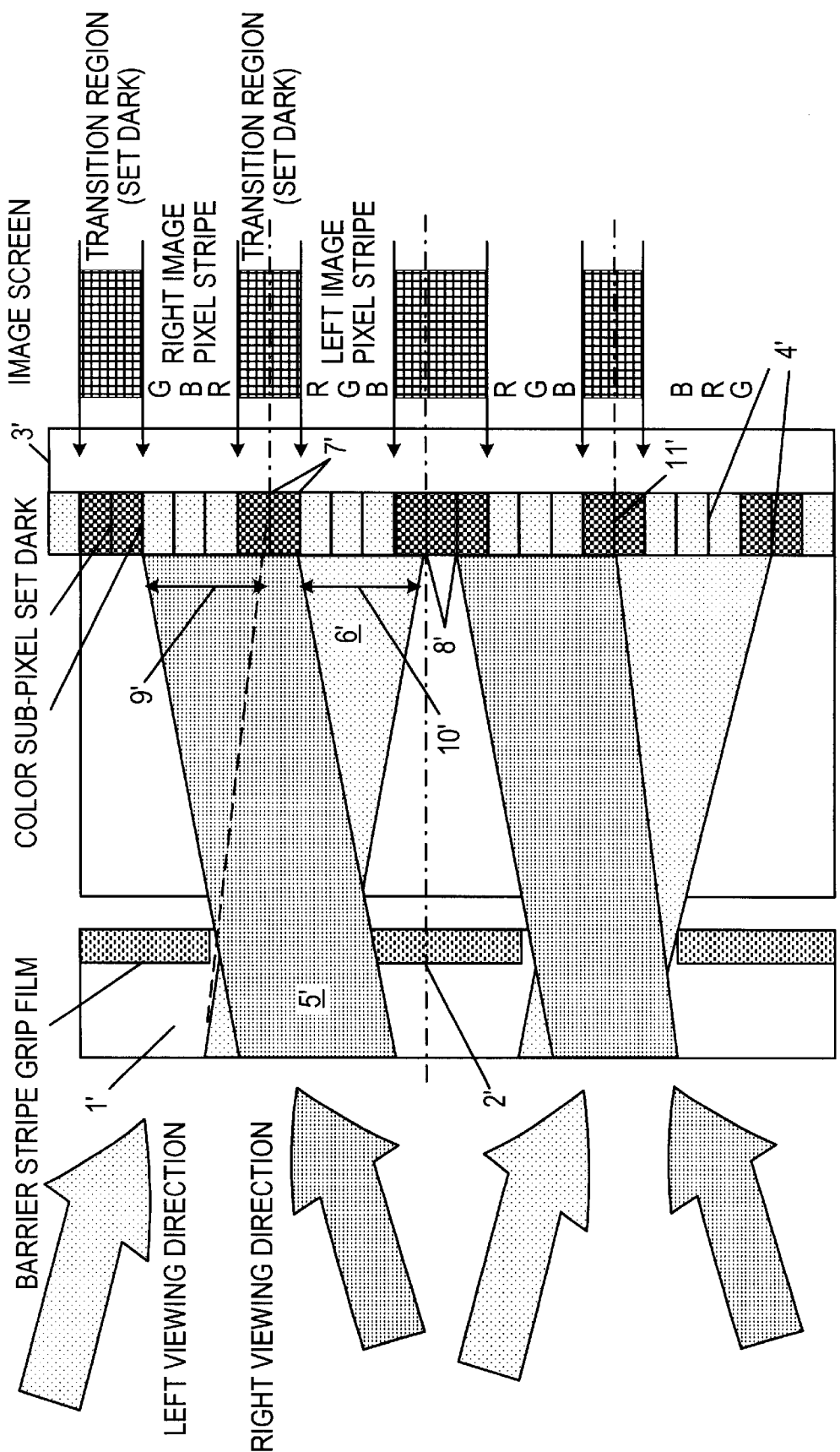
FIG. 2 is a view showing a position-adaptive autostereoscopic screen using a barrier stripe grid film.

The Position-adaptive Monitor (PAM) is designed for one observer or user in front of the monitor. The PAM screen uses a lenticular prism grid glass (1), (2) which is mounted in front of the image screen. FIG. 2 shows that the lenticular prism grid glass can be substituted by a barrier stripe grid film (1') yielding to the equivalent light flow directions for the observer's right or left eye.

Normally the image screen (3) is a flat TFT screen. But in some cases the image screen can be a panel back projection screen for large images and in some other cases also standard electronic beam tubes may be used. There exist displays displays in which not only light-emitting color sub-pixels (R,G,B) appear on the screen but also some not light-emitting areas between them which may be used for circuits. Such areas (12) are shown in FIG. 1. There exist also TFT displays or panels in which such not light-emitting areas are not interfered horizontally, that is to say the color sub-pixels (R,G,B) of one pixel are directly neighbored to the color sub-pixel of the following pixel: next to the last color sub-pixel, for example ($B_i$), of one pixel (i) follows directly the first sub-pixel, for example ($R_{i+1\ i}$) of the following pixel i+1. Such an arrangement is used in FIG. 2.

The AAC interface processes new links between the incoming sub-pixels and the display sub-pixels. On the image screen itself are displayed right and left image pixels by turns. The exact horizontal position of the left and right image pixels, each consisting of its color sub-pixels, is processed adaptively in correspondence with the observer's position: between each linked right and left image pixel occur color sub-pixels on the screen which are not linked, that is to say they are switched to dark. The number of these sub-pixels switched dark is calculated by the AAC interface according to the observer's position of the eyes.

The processed linking by the AAC interface from the left and right image pixels $P_L(i)=[R_L(i), G_L(i), B_L(i)]$ resp. $P_R(i)=[R_R(i), G_R(i), B_R(i)]$ to the pixels on the screen $P_D(k)=[R_D(k),G_D(k),B_D(k)]$ of the controlled display (monitor) is explained in more details by the following example. Each color sub-pixel $R_L(i)$ etc. is represented digitally by 8 Bit, that is to say by numbers from 0 to 255. The visibility transition from left to right and from right to left caused by the lenticular prism grid glass (2) are located at the display sub-pixel $R_D(k)$ and the following at $G_D(k+1)$, $B_D(k+1)$. This leads to the following linking of right and left image pixels to the display sub-pixel:

$P_D(k)=[R_D(k), G_D(k), B_D(k)]=[S, G_R(i), B_R(i)],$ $P_D(k+1)=[R_D((k+1), G_D(k+1), B_D(k+1)]=[R_R(i), S, S],$ $P(k+2)=[R_D((k+2), G_D(k+2), B_D(k+2)]=[R_L(i), G_L(i)\ B_L(i)].$

"S" denotes "dark" which mostly corresponds to the digital value "O" for this display color sub-pixel. Such a configuration is shown in FIG. 1, where the light rays for the right eye (5) and the light rays for the left eye (6) and the color sub-pixel arrangement on the image screen are shown,too. The light ray tracking in FIG. 1 corresponds to an optimal observer distance from the monitor. A barrier stripe grid glass (1') is used in FIG. 2 instead of a lenticular prism grid (1), (2), which leads to an equivalent color sub-pixel linking, but additional light loss occurs. The light ray tracking for the left and right eye (6'), (5') in FIG. 2 corresponds to an observer distance which is not optimal, but acceptable. In this case where the observer distance is not optimal, non-usable transition regions (7'), (8') occur on the image screen in which on the one hand the same sub-pixels (7') are visible for both eyes or on the other hand in which sub-pixels (8') are not visible for any eye. These color-subpixels in that transition regions (11') are set "dark". These not used color subpixels are marked checkedly in FIGS. 1 and 2, whereas regions on the screen (12') which do not emit light at all are marked black. The switching-off of color sub-pixels within the transition regions (7'), (8') guaranty a correct stereoscopic vision within a defined distance range for the observer. The adaptation range for the observer increases when the pitch distance of the barrier stripes is chosen wider compared to the double pixel distance of the screen. In some cases when the observer has always the same position in the optimal distance it is sufficient to chose a pitch distance of the barrier stripes for which only every forth color sub-pixel on the screen has to be set dark on the average.

Besides the left to right and right to left transition regions on the screen there appear regions (9'), (10 ') which are visible only for the right eye (9') or only for the left eye (10'). Out of these regions are chosen exactly three different color sub-pixels on the screen which are linked to the colors of the right image pixel respectively of the left image pixel—in dependence of the observer's position. This procedure is repeated for every pixel pair adaptively.

The above described observer dependent linking of left and right image pixels to the screen color sub-pixel defines exactly what the AAC interface has to do. The more detailed algorithm and logic control of the AAC interface therefore can be derived from the described adaptation procedure which is valid for both systems shown in FIGS. 1 and 2. It might be preferable to define a longer observer distance from the monitor for a system which uses barrier stripes to avoid the visibility of vertical black stripes.

The pitch distance of the stripes or prisms must be defined big enough in comparison to the double-pixel pitch of the image screen to achieve an acceptable adaptation space in which the observer gets the correct 3D vision adaptively—preferably it is chosen bigger by the coefficient 1.4 to 2, in a standard system two neighbored color subpixels should be available on the average to cover the transition regions. The non-usable transition regions on the screen have a minimum only for the optimal observer position distance. A wanted observer distance from the monitor can be defined to be the optimal distance by the adjustment of the distance of the barrier stripe grid glass from the screen.

Preferable head-tracking systems having sufficient resolution performance could be infra-red detectors which are available on the market. But also cheaper tracking systems on the basis of ultra-sonic detection can be used. An easy ultra-sonic three dimensional detection is possible when the observer carries the ultra-sonic sender on his head. The more comfortable head-trakkers detect all the three dimensions of the observer position in a defined range, so, in addition, the vertical position of the observer can be used to calculate the different vertical views of objects by the central graphic computer of the PAM system. The most comfortable but also most expensive head-trackers which do not need any additional reflection device on the head are video-camera systems in combination with real-time image recognition computers.

APPLICATION OF THE POSITION-ADAPTIVE AUTOSTEREOSCOPIC MONITOR (PAM)

Among the stereoscopic systems the autostereoscopic position-adaptive system is the one which does not need necessarily additional devices like glasses on the observer's head. In existing autostereoscopic systems lenticular lenses or prism glasses are mechanically adjusted in front of the flat screen according to the detected observer position. There is also known an autostereoscopic adaptive shutter screen [11] for which, unfortunately, the fast display technology is not yet developed today. But the presented PAM system is composed of only such components being available on the market today.

The autostereoscopic vision is restricted to one person only which is no disadvantage at workstations or at the operation room of the surgeon—for the main person in such cases is only one, anyhow. Besides the autostereoscopic version, of course, other stereoscopic systems like shutter or polarization systems can transmit the same copied scenes being stereoscopicly seen by groups.

The most important applications of the PAM system are foreseen to be medical disciplines. In most of these cases the 3D vision is wanted only by one person: the micro-surgeon or the physician who analyzes for example CT or endoscopic images being processed for special 3D views. For this application it is important to avoid restricted personal vision ranges or the carrying of disturbing devices on the head. If several physicians are active at the same time, different autostereoscopic monitors can be used but only one of them will be the master monitor. And if a whole auditorium wants to follow an operation in real time a stereoscopic two channel polarization projection can be used.

The future digital television system is foreseen to offer 3D options; it is the most comfortable visual reception manner and, fortunately, the digital transmission prevents compatible two channel coding. A PAM system can be easily built up by supplementing flat TFT monitors when they will be released in a not too expensive version. Finally, person-adaptive monitoring is also possible for large screens. Therefore, three dimensional vision for flight simulation,—navigation and telepresence will save costs for training in the real environment.

What is claimed is:

1. Position-adaptive autostereoscopic monitor (PAM) comprising: an image screen selected of a group of screens including conventional color image tubes, displays and panel back projections, said screen having a plurality of color sub-pixels of three-different colors, said subpixels being located horizontally one beside the other in a same given sequential order for defining image pixels; and a means selected of a group of means including lenticular prism grids and barrier stripe grids, said means being positioned in front of said image screen; wherein right and left image pixels are position-adaptively generated such that an area only being visible from a direction of a right eye of a viewer, an area only being visible from a left eye of a viewer, empty areas which are not visible at all from both eyes and interference areas which are at the same time visible from a direction of the right eye as well as from a direction of the left eye are obtained and that those neighbored ones of said sub-pixels are set dark which are located in said interference areas and said empty areas, and wherein said image pixels within each of said areas being visible from the directions of the right and left eye are chosen such that they contain three different ones of said color sub-pixels with a sequential order being dependent upon a viewing direction of said viewer, and wherein right and left images are presented at the same time continuously.

2. Position-adaptive autostereoscopic monitor (PAM) comprising: an image screen selected of a group of screens including conventional color image tubes, displays and panel back projections, said screen having a plurality of color sub-pixels of three-different colors, said subpixels being located horizontally one beside the other in a same given sequential order for defining image pixels; and a means selected of a group of means including lenticular prism grids and barrier stripe grids, said means being positioned in front of said image screen; wherein right and left image pixels are position-adaptively generated such that an area only being visible from a direction of a right eye of a viewer, an area only being visible from a left eye of a viewer, empty areas which are not visible at all from both eyes and interference areas which are at the same time visible from a direction of the right eye as well as from a direction of the left eye are obtained and that those neighbored ones of said sub-pixels are set dark which are located in said interference areas and said empty areas, and wherein said image pixels within each of said areas being visible from the directions of the right and left eye are chosen such that they contain three different ones of said color sub-pixels with a sequential order being dependent upon a viewing direction of said viewer, and wherein an adaptation range is magnified by decreasing said screen as compared with said grid.

3. Position-adaptive autostereoscopic monitor (PAM) comprising: an image screen selected of a group of screens including conventional color image tubes, displays and panel back projections, said screen having a plurality of color sub-pixels of three-different colors, said subpixels being located horizontally one beside the other in a same given sequential order for defining image pixels; and a means selected of a group of means including lenticular prism grids and barrier stripe grids, said means being positioned in front of said image screen; wherein right and left image pixels are position-adaptively generated such that an area only being visible from a direction of a right eye of a viewer, an area only being visible from a left eye of a viewer, empty areas which are not visible at all from both eyes and interference areas which are at the same time visible from a direction of the right eye as well as from a direction of the left eye are obtained and that those neighbored ones of said sub-pixels are set dark which are located in said interference areas and said empty areas, and wherein said image pixels within each of said areas being visible from the directions of the right and left eye are chosen such that they contain three different ones of said color sub-pixels with a sequential order being dependent upon a viewing direction of said viewer, and further comprising an atostereospopic adaptation coder is provided for generating said left and right image pixels by processing said color sub-pixels in real-time and in dependence upon predetermined or detected position data of the viewer, and wherein said autostereoscopic adaptation coder is automatically trained by using a two camera processing system for placing said cameras thereof at expected positions of the right and left eyes of the viewer and for storing respective position-dependent sub-pixel processing data obtained in a training sequence.

4. Position-adaptive autostereoscopic monitor according to claim 1 and further comprising an atostereoscopic adaptation coder for generating said left and right image pixels by processing said color sub-pixels in real-time and in dependence upon predetermined or detected position data of the viewer.

5. Position-adaptive autostereoscopic monitor according to claim 1, wherein a distance between said grid (1, 1') and said screen (3, 3') is adjustable for adjusting a basic setting of an average viewer distance as a basis for an adaptation algorithm.

6. Position-adaptive autostereoscopic monitor according to claim 4, wherein a distance between said grid (1, 1') and said screen (3, 3') is adjustable for adjusting a basic setting of an average viewer distance as a basis for an adaptation algorithm.

7. Position-adaptive autostereoscopic monitor according to claim 2, wherein said screen is said panel back projection and wherein said screen is decreased by changing a projection distance.

* * * * *